US010700986B2

United States Patent
Rahul et al.

(10) Patent No.: US 10,700,986 B2
(45) Date of Patent: Jun. 30, 2020

(54) NETWORKED FRAME HOLD TIME PARAMETER

(71) Applicant: HEWLETT PACKARD ENTERPRISE DEVELOPMENT LP, Houston, TX (US)

(72) Inventors: Kumar Rahul, Andover, MA (US); Rupin T Mohan, Andover, MA (US); Krishna Puttagunta, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/579,851

(22) PCT Filed: Jun. 11, 2015

(86) PCT No.: PCT/US2015/035333
§ 371 (c)(1),
(2) Date: Dec. 5, 2017

(87) PCT Pub. No.: WO2016/200390
PCT Pub. Date: Dec. 15, 2016

(65) Prior Publication Data
US 2018/0167331 A1   Jun. 14, 2018

(51) Int. Cl.
*H04L 12/841* (2013.01)
*H04J 14/08* (2006.01)
*H04L 1/18* (2006.01)

(52) U.S. Cl.
CPC .............. *H04L 47/28* (2013.01); *H04J 14/08* (2013.01); *H04L 1/18* (2013.01); *H04J 2203/0091* (2013.01)

(58) Field of Classification Search
CPC .. H04L 47/28; H04L 1/18; H04J 14/08; H04J 2203/0091
See application file for complete search history.

(56) References Cited

U.S. PATENT DOCUMENTS 6,449,274 B1 * 9/2002 Holden ............... H04L 12/5601
340/2.2
6,647,027 B1  11/2003 Gasparik et al.
(Continued)

OTHER PUBLICATIONS

International Search Report & Written Opinion received in PCT Application No. PCT/US2015/035333, dated Apr. 20, 2016, 14 pages.
(Continued)

Primary Examiner — Ivan O Latorre
(74) Attorney, Agent, or Firm — Hewlett Packard Enterprise Patent Department

(57) ABSTRACT

According to an example, coordination of adjustments to network frame hold time parameters between network devices in a network is initiated based on a trigger condition. Time data may be obtained from a plurality of network devices in the network, where the time data describes a network frame hold time parameter of each network device in the plurality and a network frame processing time of each network device. A set of affected network devices affected by network back pressure in the network, and a set of non-affected network devices in the plurality not included in the set of affected network devices, may be determined. Based on the time data, a pairing may be determined between a time-available network device from the set of non-affected network devices and a time-needed network devices, from the set of affected network devices, to receive an allocation of time credit from the time-available network device.

20 Claims, 6 Drawing Sheets

(56) References Cited

U.S. PATENT DOCUMENTS

| | | | |
|---|---|---|---|
| 6,832,299 B2 | 12/2004 | Shimada et al. | |
| 6,990,071 B2 | 1/2006 | Adam et al. | |
| 6,996,214 B1* | 2/2006 | Beck | H04M 3/4281 |
| | | | 379/215.01 |
| 7,551,556 B2* | 6/2009 | Henriques | H04M 15/58 |
| | | | 370/230 |
| 7,760,638 B2 | 7/2010 | Shimonishi et al. | |
| 8,477,689 B2* | 7/2013 | Zhang | H04W 74/0816 |
| | | | 370/328 |
| 2005/0030978 A1 | 2/2005 | Dropps et al. | |
| 2005/0182856 A1 | 8/2005 | McKnett | |
| 2006/0056308 A1* | 3/2006 | Gusat | H04L 45/00 |
| | | | 370/252 |
| 2008/0212472 A1* | 9/2008 | Musacchio | H04L 49/254 |
| | | | 370/232 |
| 2009/0048890 A1* | 2/2009 | Burgh | G06Q 10/04 |
| | | | 705/7.15 |
| 2009/0274160 A1* | 11/2009 | Yanagihara | H04L 12/1854 |
| | | | 370/408 |
| 2010/0235488 A1 | 9/2010 | Sharma et al. | |
| 2011/0276665 A1* | 11/2011 | Kim | H04W 76/20 |
| | | | 709/220 |
| 2012/0063303 A1* | 3/2012 | Gnanasekaran | H04L 43/16 |
| | | | 370/230 |
| 2012/0063304 A1* | 3/2012 | Gnanasekaran | H04L 49/15 |
| | | | 370/230 |
| 2012/0063329 A1* | 3/2012 | Gnanasekaran | H04L 41/0213 |
| | | | 370/248 |
| 2012/0063333 A1* | 3/2012 | Gnanasekaran | H04L 47/10 |
| | | | 370/252 |
| 2012/0110162 A1* | 5/2012 | Dubovik | H04L 12/6418 |
| | | | 709/224 |
| 2013/0286858 A1* | 10/2013 | Gnanasekaran | H04L 41/0213 |
| | | | 370/244 |
| 2013/0322450 A1* | 12/2013 | Ueta | H04L 45/74 |
| | | | 370/392 |
| 2014/0280885 A1* | 9/2014 | Ayandeh | H04L 43/0894 |
| | | | 709/224 |
| 2015/0222549 A1* | 8/2015 | Kakadia | H04L 47/18 |
| | | | 370/231 |
| 2015/0373729 A1* | 12/2015 | Lee | H04W 8/245 |
| | | | 370/329 |

OTHER PUBLICATIONS

Kay, R., Pragmatic Network Latency Engineering Fundamental Facts and Analysis, (Research Paper), Jul. 15, 2009, 31 pps. http://cpacket.com/wp-contents/files_mf/introductiontonetworklatencyengineering.pdf.

* cited by examiner

NETWORKED FRAME HOLD TIME PARAMETER

BACKGROUND

Various network technologies, such as Fibre Channel, require that a network frame be dropped if the network frame is delayed more than a certain time duration in a network device (e.g., switch, router, etc.) while waiting to be forwarded to another network device. As a result, in storage area network (SAN) fabric implemented by Fibre Channel, network frames get dropped if they remain in the SAN for more than an allowed time threshold. Generally, the allowed time threshold is implemented as a configurable parameter to hold a network frame a certain duration before it is dropped, thereby ensuring that the network frame reaches its destination before an allowed delay limit.

BRIEF DESCRIPTION OF THE DRAWINGS

Certain examples are described in the following detailed description in reference to the following drawings.

FIGS. 6 and 7 are block diagrams illustrating example network devices according to the present disclosure.

DETAILED DESCRIPTION

Figure 1:
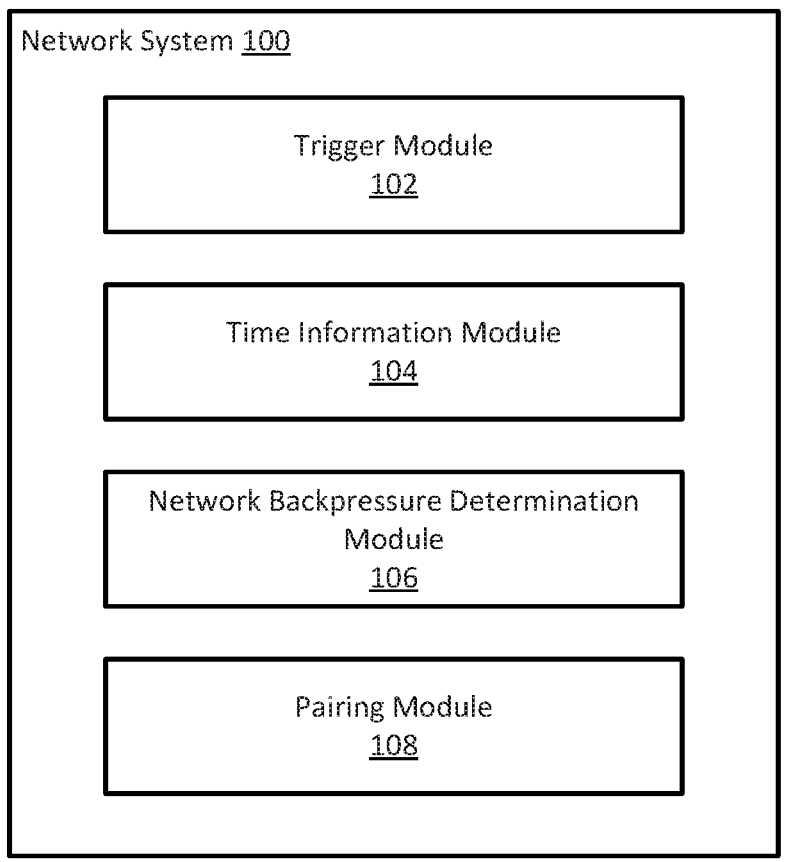
FIGS. 1 and 2 are block diagrams illustrating example network systems that facilitate adjustment of a network frame time hold parameter according to the present disclosure.

Certain conventional network devices, such as those based on the Fibre Channel standard and used in storage area networks (SANs), network frames are dropped if they remain in the network more than an allowed threshold time limit specified by the Fibre Channel standard. To implement the threshold time limit and ensure timely delivery, such conventional network devices (e.g., network switches, network routers, etc.) include a configurable parameter (hereafter, a network frame hold time) that determines how long a network frame (e.g., including a network packet), waiting to be forwarded to another network device (e.g., another network switch), will be held in buffer queue before it is dropped at the network device.

As used herein, the network frame forward delay time value (hereafter, network frame forward delay) can be associated with a network port of a network device and may refer to the time required for that network device to forward a network frame arriving at the network port to the network frame's next network hop. Accordingly, the network frame forward delay associated with a network port may be calculated by subtracting the time the network frame arrived at a network device from the time the network frame is forwarded to the next network hop. The network frame forward delay can differ between different network ports of a network device. As also used herein, an average network frame forward delay can be associated with a network device and may be calculated by averaging together the network frame forward delay associated with each network port of the network device (i.e., for an n-port network device, the average is calculated by summing up all the network frame forward delays and dividing the sum by n). The average network frame forward delay can differ between conventional network devices in a network and, as a result, those conventional network devices having higher network frame forward delay than others may present a bottleneck for network traffic flowing through the network.

Generally, when a network frame to be forwarded from a conventional network device to another network device (e.g., network switch) is received at the conventional network device, it is queued at the conventional network device until such time as the next network hop (i.e., the other network device) is ready to receive the network frame, or until the network frame is dropped from the network frame buffer queue based on the network frame hold time. In some contexts, the next network hop network device may not be ready to receive a network frame when the next network hop network device is experiencing higher work load than other network devices in its network, has reached its resource limits (e.g., hardware limits), or is slow to drain network frames. Typically, as the number of network frames on the network frame buffer queue increases for a conventional network device, so does the average network frame forward delay of that network device. Additionally, an increase in average network frame forward delay of a conventional network device, in turn, causes an increase in the number of network frames being dropped as a result of the network frame hold time limit being reached (by network frames on the network frame buffer queue). Consequently, a conventional network device can present a bottleneck and cause network back pressure in a network as its average frame forward delay increases and the number of network frames dropped increases.

Various examples described herein provide systems and methods that permit a set of network devices in a network to dynamically adjust (e.g., tune) their respective network frame hold time parameter based on conditions in the network, such as the presence of network back pressure in the network (e.g., as a result of a network bottleneck). For some examples, the adjustment of network frame hold time parameters of various network devices in a network involves coordination between those network devices. Additionally, in some examples, the adjustment of network frame hold time parameters of various network devices is coordinated between those network devices by way of a network device designated as the principal network device in the network (e.g., designated by a manual selection or automatically elected by the network devices during handshake process between the network devices).

Where a first network device experiencing an average network frame forward delay that is higher than a second network device, certain examples coordinate an adjustment of network frame hold time parameters between the two network devices such that the network frame hold time parameter of the second network device is reduced by a specific amount of time and the network frame hold time parameter of the first network device is increased by the specific amount of time. In this way, the second network device can allocate time credit from its network frame hold time parameter, the resulting allocation of time credit can be transferred from the second network device to the first network device, and the first network device can apply (e.g., add) the allocation of time credit to its own network frame hold time parameter. In applying the allocation of time credit to its network frame hold time parameter, the first network device can attempt to alleviate network back pressure (e.g., network frame drops due to high network frame forward delay) being experienced by, and which may possibly be caused by (e.g., due to resource limitations), the first network device. Additionally, in this way, such examples can adjust network frame hold time parameters within a network while complying with overall timing requirements of the network as defined by a network standard the network implements (e.g., Fibre Channel standard, which requires that a network frame not be delayed in the network longer than 4 seconds).

As used herein, a network device can include a network switch, network router, network gateway, network hub, or a network-enabled electronic device having a processor. Additionally, as used herein, a network frame can include a network packet that is transported over a communications network. With respect to various examples described herein, a network device in a network being affected by network back pressure in the network (and thus experience increased average network frame forward delay) may be referred to herein as an affected network device. A network device in a network not being affected by the same network back pressure may be referred to herein as a non-affected network device. Further, a network device in a network that is a candidate to provide an allocation of time credit to another network device in the network may be referred to herein as a time-available network device or a time-loaner network device. A network device in a network that is a candidate to receive an allocation of time credit from another network device in the network may be referred to herein as a time-needed network device or a time-receiver network device.

According to various examples, a first network device in a given network monitors for when its average network frame forward is greater than (or equal to) a threshold value, where the threshold value may be a parameter for the first network device that is manually set by an individual (e.g., user-defined parameter set by a network administrator). Depending on the example, the threshold value may depend on network frame priority queues for the first network device, and may be adjusted (e.g., tuned) to improve overall performance or quality of service (QoS) of the overall network. For various examples, the threshold value is set to be lesser than or equal to the current network frame hold time parameter of the first network device. Further, for various examples, the threshold value serves as a trigger for initiating the adjustment of the network frame hold time parameter of the first network device and of at least one other network device in the network. In particular, when the network frame forward delay of the first network device is greater than (or equal to) the threshold value, this can serve as an indication that the first network device is presenting a bottleneck in the network or the first network device is experiencing network back pressure.

Accordingly, when the average network frame forward delay of the first network device is greater than (or equal to) the threshold value, the first network device can trigger a process by which the network frame hold time parameter of the first network device and of at least one other network device in the network are adjusted in effort to alleviate the network bottleneck or back pressure detected (by way of the threshold value being surpassed). The first network device, serving as the trigger network device, may cause the process for coordinating the adjustment of network frame hold time parameters to initiate at the first network device, or at another network device in the network, such as a one designated the principal network device in the network (e.g., a principal network switch in a Fibre Channel-based network). Hereinafter, a network device coordinating the adjustment of the network frame hold time parameters between network devices in a network may be referred to as the coordinating network device. As noted above, the trigger network device may cause the process for coordinating the adjustment to be initiated on itself (rather than another network device), in which case the trigger network device and the coordinating network device are same network device. A network device triggering the adjustment of the network frame hold time parameters between network devices in a network (e.g., when it average network frame forward delay surpasses a threshold value) is referred to as the trigger network device.

Depending on the example, some or all network devices in the network may operate similarly to the first network device described above and include a threshold value to determine when to trigger the adjustment of its network frame hold time parameter and that of another network device in the given network.

At the beginning of the coordination process, the coordinating network device may obtain (e.g., request and then receive) from each network device, in a set of network devices in the network, a tuple containing the (time) value of their network frame hold time parameter and their current processing time. The current processing time may comprise the network device's current average network frame forward delay. The set of network devices from which tuples are obtained may include some or all of the network devices in a network associated with the coordinating network device. Based on the trigger network device, the coordinating network device determines direction of network back pressure from the trigger network device and the direction of the anti-back pressure from the network device. This determination may be determined based on the topology of the network and the direction of network traffic. Hereinafter, a network device affected by the determined network back pressure is referred to as an affected network device, while one that is not is referred to a non-affected network device. Based on the information regarding processing time (from the obtained tuples), the determined network back pressure, and the determined anti-back pressure, the coordinating network device determines pairings between non-affected network devices having available processing time (hereafter, time-available network devices) and affected network devices needing processing time (hereafter, time-needed network devices). These pairings may be one-to-one, where one non-affected network device is paired with one affected network devices, or may be one-to-many, where one non-affected network device is paired with many affected network devices. Additionally, these pairings may be many-to-one, where many non-affected network devices are paired with one affected network device. Based on the determined pairings, the coordinating network device may generate and provide data regarding the pairings to each of the time-available network devices included in at least one determined pairing. This data (hereafter, pairing data) sent to an individual time-available network device may describe all the pairings determined by the coordinating network device, or only those pairings that include the individual time-available network device. Additionally, the pairing data may provide the values of the network frame hold time parameter of the time-available network device and the processing time (e.g., average network frame forward delay) of the time-available network device (as reported to the coordinating network device), and the values of the network frame hold time parameter and the processing time (e.g., average network frame forward delay) of the time-needed network device (as reported to the coordinating network device).

Based on pairing data received from the coordinating network device, a time-available network device may determine (e.g., calculate) how much time credit it can allocate from its network frame hold time parameter to the time-needed network device to which it is paired according to the pairing data. This allocation time credit may be determined in view of the time-available network devices current processing time (e.g., current network frame forward delay) or the processing time of the time-available network device as described in the pairing data (and originally reported to the coordinating network device by the time-available network device). The time-available network device may then adjust (e.g., update) its own network frame hold time parameter based on allocation of time credit. The time-available network device may also request the time-needed network device update its network frame hold time parameter based on the allocation of time credit. Depending on the example, the time-available network device may adjust its own network frame hold time parameter (based on allocation of time credit) before it requests the time-needed network device update its network frame hold time parameter based on the allocation of time credit. After sending the request, the time-available network device may await acknowledgement from the time-needed network device that it has adjusted its network frame hold time parameter as requested.

Based on the request received from the time-available network device, the time-needed may adjust (e.g., update) its network frame hold time parameter based on the allocation of time credit described in the request. Subsequent to this adjustment, the time-needed network device may send an acknowledgment of the time-available network device confirming the adjustment has been implemented.

For some examples, after receiving acknowledgement from the time-needed network device confirming adjustment of its network frame hold time parameter as requested, the time-available network device may send an acknowledgement to the coordinating network device confirming completion of the adjustment for the time-available network device according to the pairing data. In the event the time-available network device does not receive an acknowledgement from the time-needed network device (e.g., before a pre-determined time limit expires), the time-available network device may not send an acknowledgement to the coordinating network device and, as a result, the coordinating network device may restart the adjustment process (e.g., start by re-obtaining from network tuples containing the value of their respective network frame hold time parameters and current processing times).

The following provides a detailed description of examples illustrated by FIGS. 1-7.

FIG. 1 is a block diagram illustrating an example network system 100 that facilitates adjustment of a network frame time hold parameter according to the present disclosure. For some examples, the network system 100 is included by a coordinating network device in a network, which in the context of a Fibre Channel network, may be the principal network device. As shown, the network system 100 includes a trigger module 102, a time information module 104, a network back pressure determination module 106, and a pairing module 108. Depending on the example, the network system 100 may be part of a network device that includes a processor, such as a networked computer system (e.g., desktop, laptop, server, etc.), network switch, network router, network gateway, or any device capable of receiving and sending a network packet. In various examples, the components or the arrangement of components in the network system 100 may differ from what is depicted in FIG. 1.

As used herein, modules and other components of various examples may comprise, in whole or in part, machine-readable instructions or electronic circuitry. For instance, a module may comprise machine-readable instructions executable by a processor to perform one or more functions in accordance with various examples described herein. Likewise, in another instance, a module may comprise electronic circuitry to perform one or more functions in accordance with various examples described herein. The elements of a module may be combined in a single package, maintained in several packages, or maintained separately.

The trigger module 102 may initiate, based on a trigger condition, coordination of adjustments to network frame hold time parameters between at least two network devices in a network. The trigger condition may the detection of network congestion or a bottleneck in the network. Monitoring the network frame forward delay of various network devices in the network can assist in detecting such congestion or bottlenecks. Depending on the example, such monitoring may be conducted at the network system 100 or a separate network device in the network serving as a trigger network device. In particular examples, trigger condition comprises receiving, from a trigger network device in the network, a signal indicating that a network frame processing time of the trigger network device exceeds (or equals) a trigger threshold. As described herein, the trigger threshold may a parameter of the trigger network device that is manually set by an individual (e.g., a network administrator), and which may be set based on network frame priority queues of the trigger network device.

The time information module 104 may facilitate obtaining time data from a plurality of network devices in the network. The plurality of network devices, which can comprise network switches, network routers, network gateways, and the like, may include some or all of the network devices associated with the network. The time information module 104 may facilitate obtaining the time data by requesting each network device report its respective time information (e.g., network frame processing time and network frame hold time parameter) to the network system 100. The time information may be received from the individual network devices as tuples containing requested time values. As described herein, a network frame hold time parameter associated with a given network device may be set to a value representing the amount of time a network frame to be forwarded to another network device is held in the buffer queue of the given network device before it is dropped. As also described herein, the network frame processing time associated with a given network device may comprise the average network frame forward delay of the given network device.

The network back pressure determination module 106 may facilitate determining, based on the time data from the time information module 104, a set of affected network devices being affected by network back pressure in the network and a set of non-affected network devices not included in the set of affected network devices. The set of affected network devices can include a trigger network device that signaled start of the coordination efforts by the network system 100 (via the trigger module 102). Additionally, the set of affected network devices in the network may be those dropping network frames as a result if increased network frame processing time, which may be the result of network congestion or a network bottleneck in the network.

Determining the set of affected network devices and the set of non-affected network devices may involve determining the direction of the network backpressure (e.g., from the trigger network device) caused by network congestion or a bottleneck present in the network. Determining the set of affected network devices and the set of non-affected network devices may also involve determining the direction opposite to the network backpressure (referred to herein as, "anti-back pressure"). Analysis of the topology of the network may be involved in determining either of these directions.

The pairing module 108 may facilitate determining, based on the time data from the time information module 104, a pairing between a time-available network device in the set of non-affected network devices and a time-needed network device in the set of affected network devices, the time-needed network device being a candidate for receiving an allocation of time credit from the time-available network device to adjust its associated network frame hold time parameter based on the allocation. The time-available network device may be a network device in the network that the network system 100 identifies as having available network frame processing time based on the network frame processing time the time-available network device provided in the time data obtained by the time information module 104. According to various examples described herein, the time-available network device is to provide the allocation of time credit from its own network frame hold time hold parameter, thereby resulting in a reduction in the parameter value.

For various examples described herein, including the network system 100, communication with network devices in the network is achieved by way of standard control information that that enables operation of the network. For instance, in the context of a Fibre Channel network, communication of signals, time data, or pairing data between the network system 100 and a network device in the network may be facilitated (e.g., transported within) through a link control frame, a link service frame, or an extended link service frame.

Figure 2:
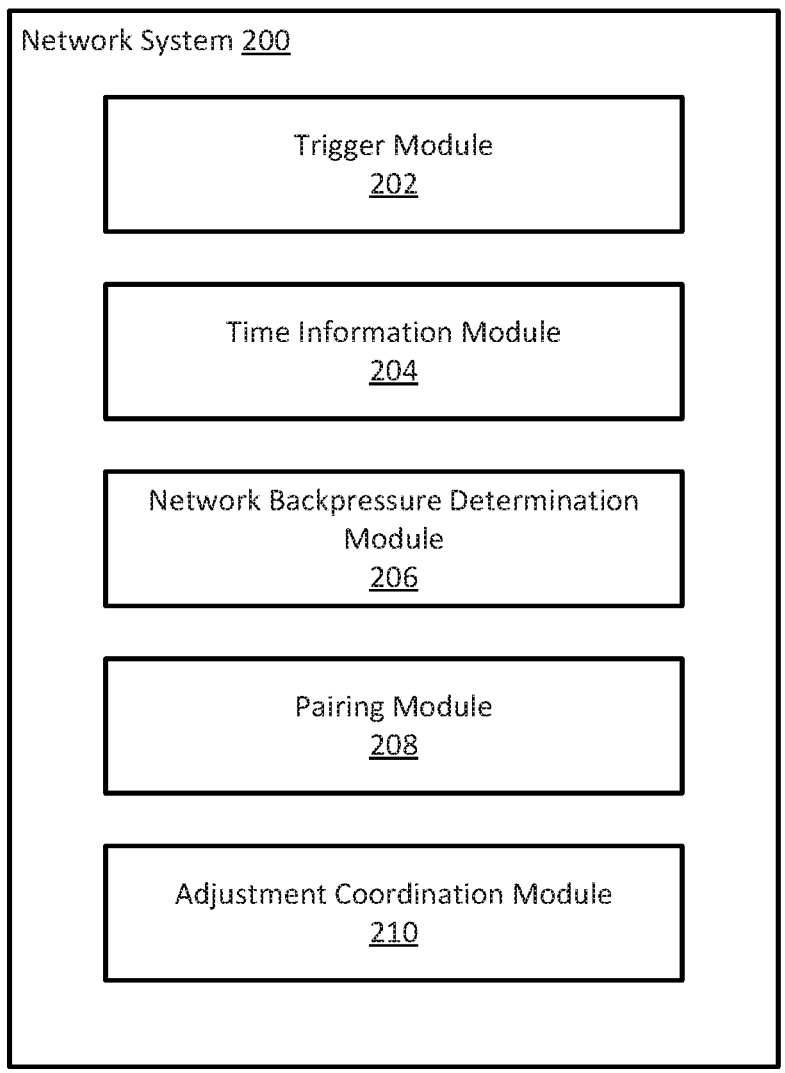

FIG. 2 is a block diagram illustrating an example network system 200 that facilitates adjustment of a network frame time hold parameter according to the present disclosure. As shown, the network system 200 includes a trigger module 202, a time information module 204, a network back pressure determination module 206, a pairing module 208, and an adjustment coordination module 210. In various examples, the components or the arrangement of components in the network system 200 may differ from what is depicted in FIG. 2.

For some examples, the trigger module 202, the time information module 204, the network back pressure determination module 206, and the pairing module 208 are respectively similar to the trigger module 102, the time information module 104, the network back pressure determination module 106, and the pairing module 108 of the network system 100 described above with respect to FIG. 1.

The adjustment coordination module 210 may facilitate coordination of transfer of the allocation of time credit between the time-available network device and the time-needed network device. Coordinating the transfer of the allocation of time credit can comprise providing the time-available network device with pairing data describing the pairing between the time-available network device and the time-needed network device, describing the network frame hold time parameter of the time-needed network device, and describing the network frame processing time of the time-needed network device. The pairing data may also describe the network frame hold time parameter of the time-available network device and the network frame processing time of the time-available network device, which may the time-available network device rely on when determining the allocation of time credit for the time-needed network device. For some examples, the network system 200 may provide the pairing data to at least all network devices in network that are included in at least one pairing described by the pairing data.

Coordinating the transfer of the allocation of time credit may further comprise monitoring for an acknowledgment from the time-available network device at least indicating that the time-needed network device has adjusted its associated network frame hold time parameter. According to some examples, the adjustment coordination module 210 may cause the time information module 204, the network back pressure determination module 206, and the pairing module 208 to repeat their respective operations if the acknowledgement is not received from the time-available network device within a timeout period.

Figure 3:
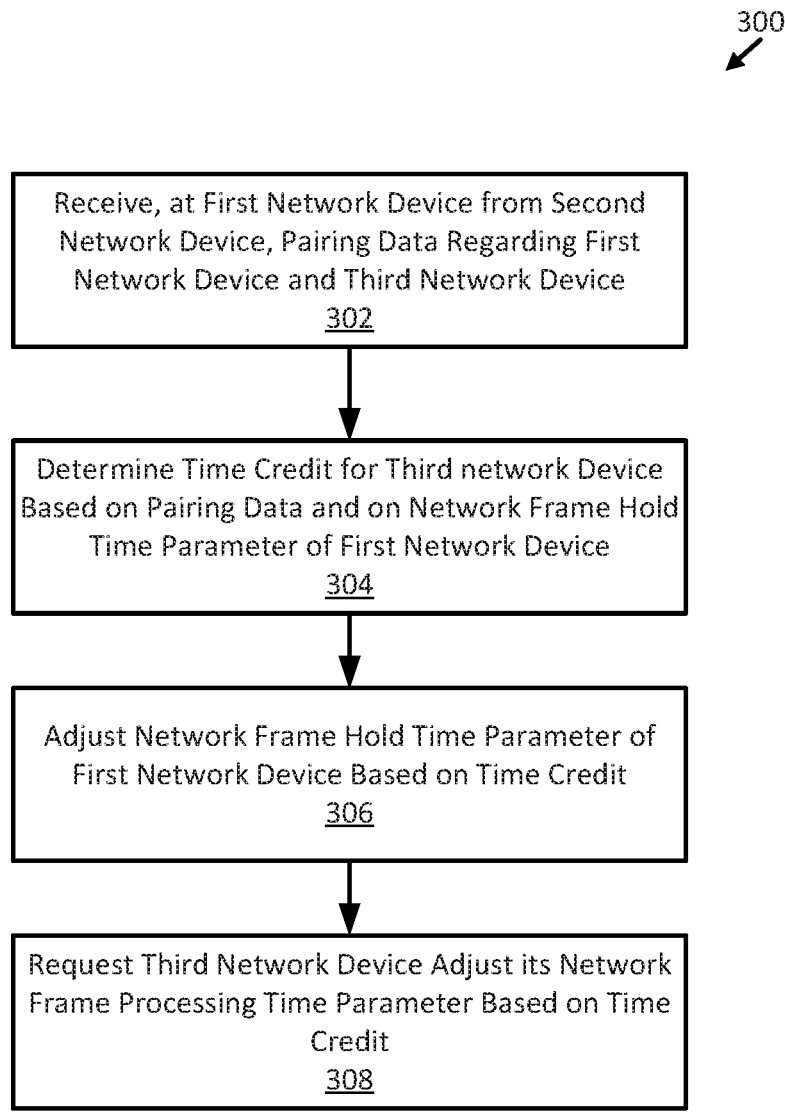
FIGS. 3 and 4 are flowcharts illustrating example methods performed by an example network device to facilitate adjustment of a network frame time hold parameter according to the present disclosure.

FIG. 3 is a flowchart illustrating an example method 300 performed by an example network device to facilitate adjustment of a network frame time hold parameter according to the present disclosure. For some examples, the method 300 may be one performed by a time-available network device in a network. The method 300 may be implemented in the form of executable instructions stored on a machine-readable medium or in the form of electronic circuitry. Though the method 300 is described below from the perspective of a first network device in a network performing blocks 302, 304, 306 and 308, for some examples, less than all of the blocks be performed by the first network device.

In FIG. 3, the method 300 may begin at block 302 by a first network device (e.g., time-available network device) in a network receiving pairing data from a second network device (e.g., coordinating network device) in the network. The pairing data may describe a pairing between the first network device and a third network device (e.g., time-needed network device) in the network, may describe a network frame hold time parameter of the third network device, and may describe the network frame processing time of the third network device. As described herein, the pairing may be one determined by the second network device based on time data the second network device obtained from various network devices in the network, including the first network device.

The method 300 may continue to block 304 by the first network device determining an allocation of time credit for the third network device based on the pairing data and a network frame hold time parameter of the first network device. As described herein, for some examples, the network frame hold time parameter of the first network device may be adjusted down based on the allocation of time credit determined by the first network device.

The method 300 may continue to block 306 by the first network device adjusting the network frame hold time parameter of the first network device by reducing the network frame hold time parameter of the first network device by the allocation of time credit. The method 300 may then continue to block 308 by the first network device requesting the third network device to adjust the network frame hold time parameter of the third network device based on the allocation of time credit. For some examples, the first network device adjusts its own network frame hold time parameter based on the allocation of time credit before it requests the third network device to adjust its network frame hold time parameter based on the allocation.

Figure 4:
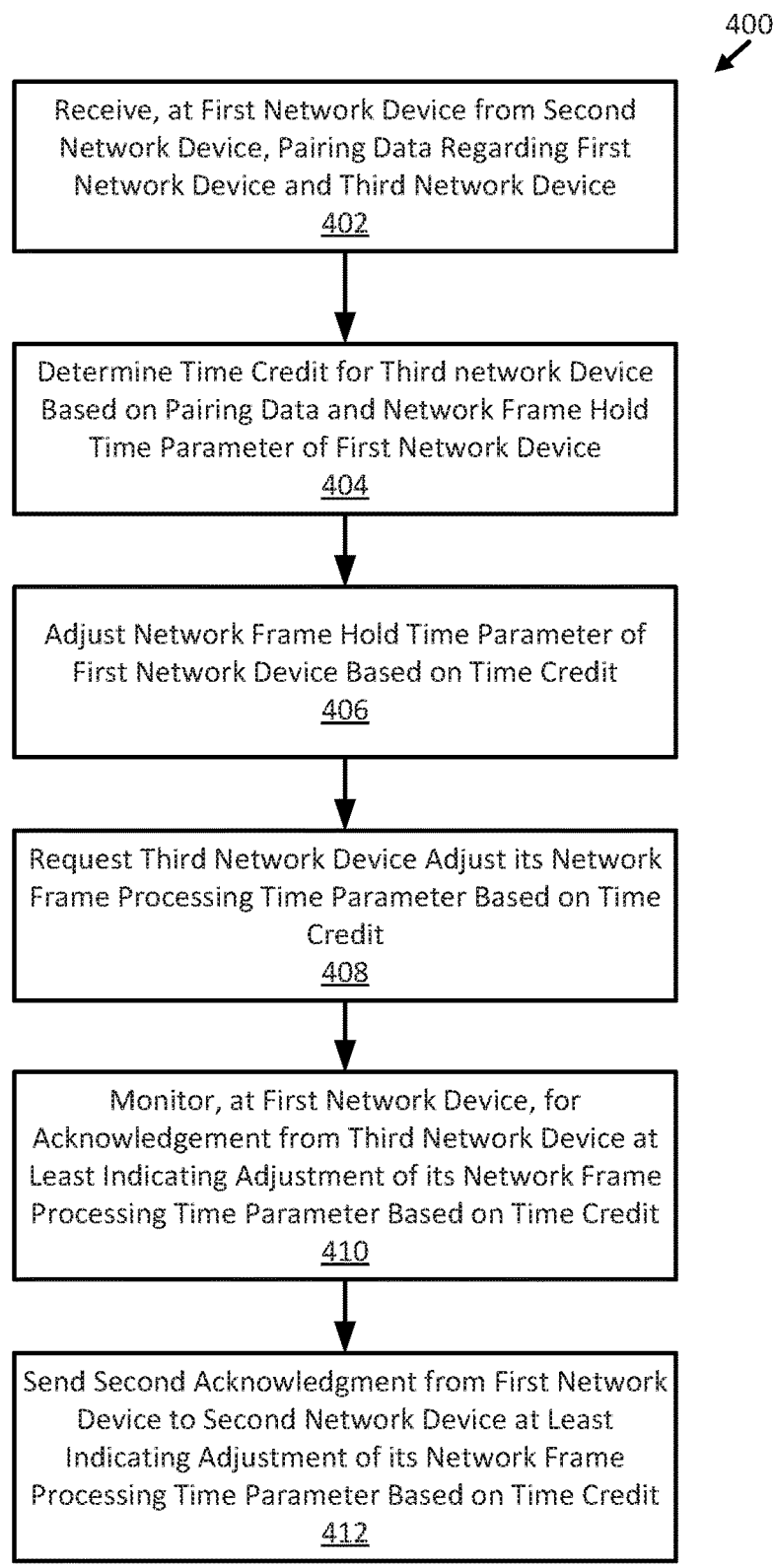

FIG. 4 is a flowchart illustrating an example method 400 performed by an example network device to facilitate adjustment of a network frame time hold parameter according to the present disclosure. For some examples, the method 400 may be one performed by a time-available network device in a network. The method 400 may be implemented in the form of executable instructions stored on a machine-readable medium or in the form of electronic circuitry. Though the method 400 is described below from the perspective of a first network device in a network performing blocks 402, 404, 406, 408, 410, and 412, for some examples, less than all of the blocks be performed by the first network device.

In FIG. 4, the method 400 may begin at block 402 and may continue to blocks 404, 406, and 408, which may be respectively similar to blocks 302, 304, 306, and 308 of the method 300 as described above with respect to FIG. 3. Additionally, blocks 402, 404, 406, and 408 of the method 400 may be exclusively performed by the first network device.

The method 400 may continue to block 410 by the first network device monitoring for an acknowledgment from the third network device at least indicating that the third network device has adjusted the network frame hold time parameter of the third network device based on the allocation of time credit. The method 400 may continue to block 412 by the first network device sending a second acknowledgment from the first network device to the second network device after receiving the acknowledgment at the first network device. Depending on the example, the second acknowledgment may at least indicate that the third network device has successfully adjusted its network frame hold time parameter based on the allocation of time credit. As described herein, where the first network device fails to send a second acknowledgment to the second network device within a certain timeout period, the second network device may cause the overall adjustment process to restart.

Figure 5:
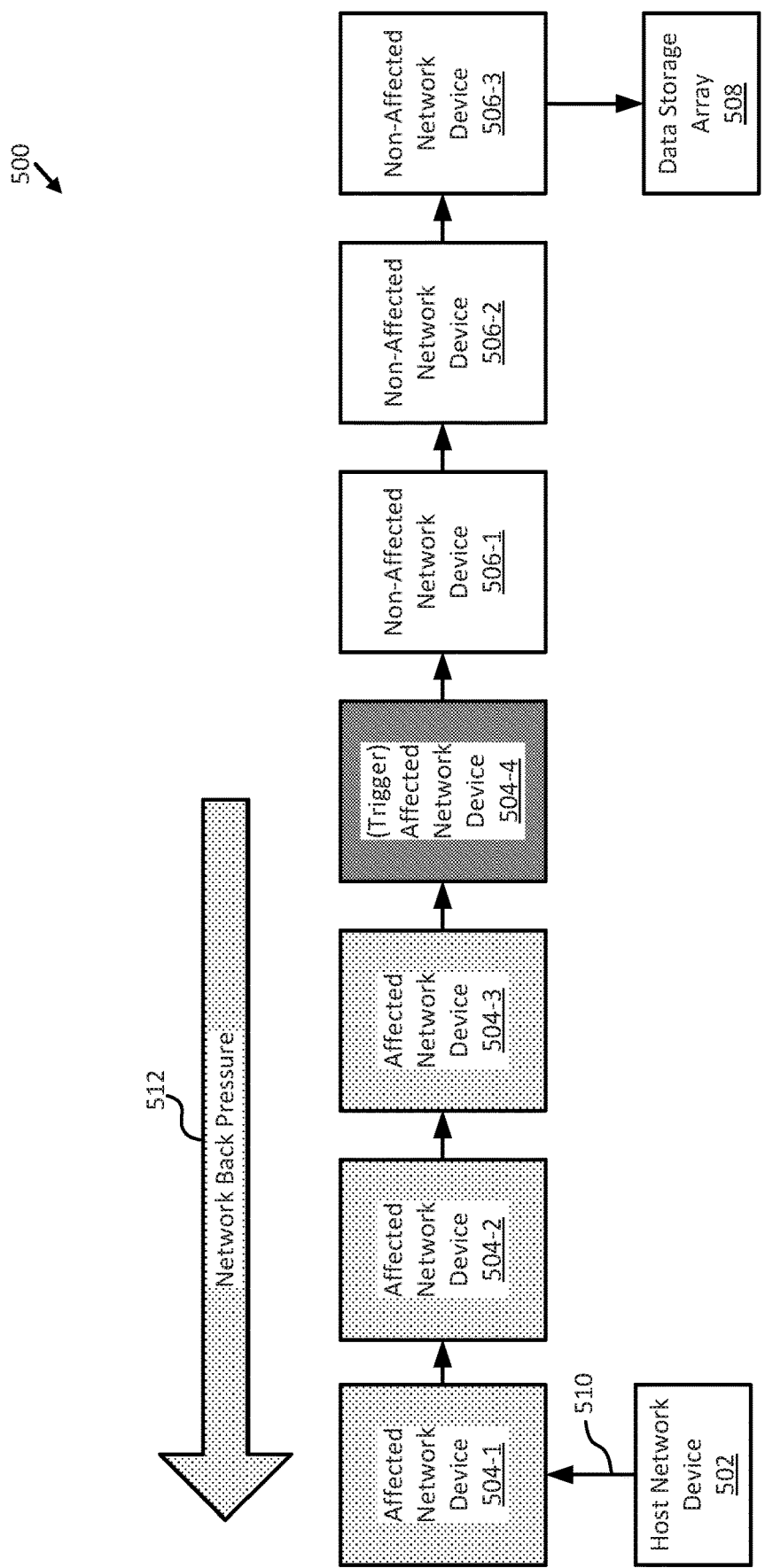
FIG. 5 is a block diagram illustrating an example network environment that includes example network devices describes in the present disclosure.

FIG. 5 is a block diagram illustrating an example network environment 500 that includes example network devices describes in the present disclosure. In particular, the network environment includes a plurality of network devices that are part of a network experiencing network back pressure 512. As shown, the network environment 500 includes a host network device 502, a set of network devices affected by the network back pressure 512 (collectively referred hereafter as affected network devices 504-1 to 504-4), a set of network devices not affected by the network back pressure 512 (collectively referred hereafter as affected network devices 506-1 to 506-3), and a data storage array 508. The host network device 502 may include a networked computer system, and the data storage array 508 may include a plurality of data storage devices implementing a storage area network (SAN) device. As described herein, each of the network devices 504 and 506 may be a networked computer system, a network switch, a network router, a network router, or another device capable of receiving and sending a network packet. The network devices 504 and 506 may implement a storage area network (SAN) by which the host network device 502 may access (e.g., read data from, write data to, or modify data stored on) the data storage array 508. During such data access operations, the host device 502 and the data storage array 508 may exchange network packets through the network devices 504 and 506.

During operation, the host network device 502 sends a network frame to the data storage array 508 via a network path 510. As shown in FIG. 5, the network path 510 passes through the affected network devices 504 and the non-affected network devices 506. After the host network device 502 sends the network frame, it may wait for acknowledgement before a timeout occurs. In the context of a SAN, the network frame may comprise a Small Computer Serial Interface (SCSI) command, and the host network device 502 may send an ABORT command if it does not receive an acknowledgement of the SCSI command before the timeout period. The occurrences of timeouts can have a negative impact on storage access performance of the SAN by the host network device 502. Based on the network back pressure, the network frame sent from the host network device 502 has the possibility of being dropped at the affected network device 504-1, 504-2, 504-3, or 504-4.

According to some examples, the affected network device 504-4 can operate as a trigger network device, and signal (e.g., to a coordinating network device not shown) when the affected network device 504-4 detects that its network frame processing time (e.g., comprising its average network frame forward delay) has exceeded (or is equal to) a trigger threshold value. As described herein, when the network frame processing time exceeds the trigger threshold, this can be an indication that the affected network device 504-4 is experiencing network back pressure or is presenting a bottleneck in the network, which in turn can cause in an increase in dropped network frames at the affected network device 504-4 or the other affected network devices 504. As described herein, the signal from the affected network device 504-4 can trigger the adjustment of network frame hold time parameters of the affected network devices 504. Upon successful adjustment, one or more of the affected network devices 504-1, 504-2, 504-3, and 504-4 may have adjusted network frame hold time parameters that assist in alleviating the effects of a network bottleneck at the affected network device 504-4 or the network back pressure 512 caused by the network bottleneck.

Figure 6:
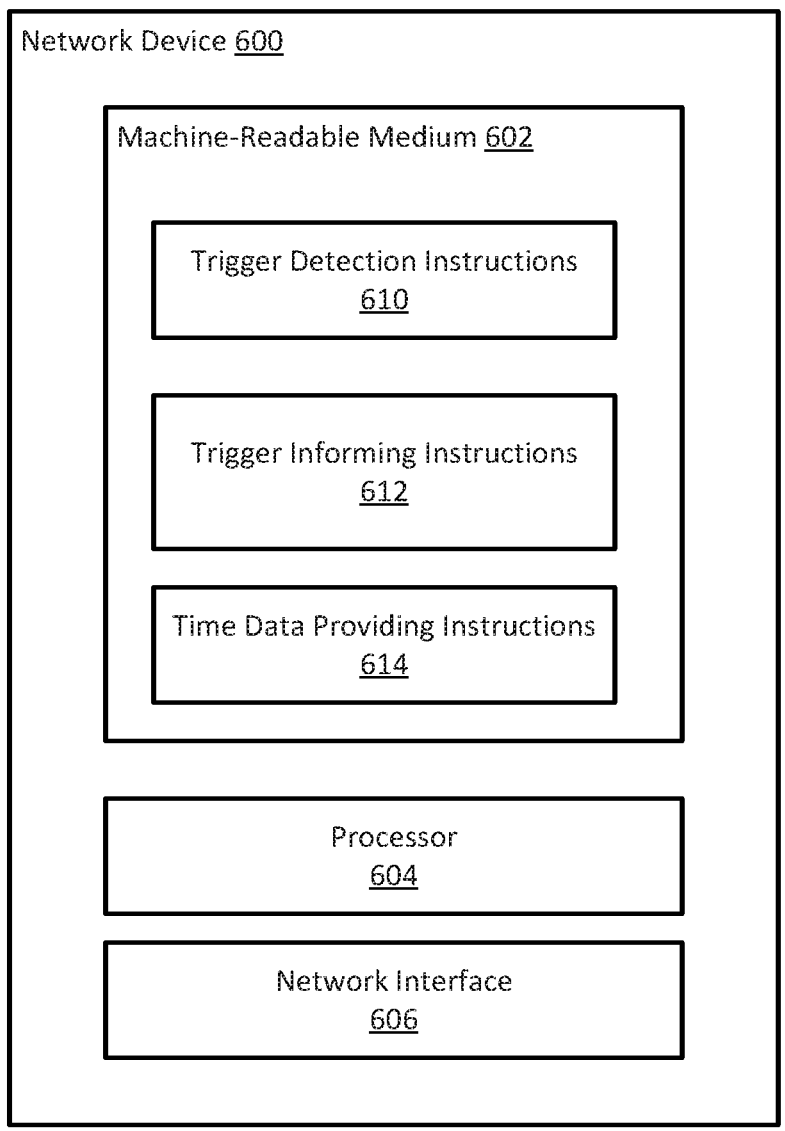

FIG. 6 is block diagram illustrating an example network device 600 according to the present disclosure. As described herein, the network device 600 may be any network device having a processor, such as a networked computer system (e.g., desktop, laptop, server, etc.), network switch, network router, or network gateway. For some examples, the network device 600 operates as a trigger network device in a network. As shown, the network device 600 includes a machine-readable medium 602, a processor 604, and a network interface 606. In various examples, the components or the arrangement of components of the network device 600 may differ from what is depicted in FIG. 6. For instance, the network device 600 can include more or less components than those depicted in FIG. 6.

The machine-readable medium 602 may be any electronic, magnetic, optical, or other physical storage device that stores executable instructions. For example, the machine-readable medium 602 may be a Random Access Memory (RAM), an Electrically-Erasable Programmable Read-Only Memory (EEPROM), a storage drive, an optical disc, or the like. The machine-readable medium 602 can be encoded to store executable instructions that cause the processor 604 to perform operations in accordance with various examples described herein. In various examples, the machine-readable medium 602 is non-transitory. As shown in FIG. 6, the machine-readable medium 602 includes trigger detection instructions 610, trigger informing instructions 612, and time data providing instructions 614.

The processor 604 may be one or more central processing units (CPUs), microprocessors, or other hardware devices suitable for retrieval and execution of one or more instructions stored in the machine-readable medium 602. The processor 604 may fetch, decode, and execute the instructions 610, 612 and 614 to enable the network device 600 to perform operations in accordance with various examples described herein. For some examples, the processor 604 includes one or more electronic circuits comprising a number of electronic components for performing the functionality of one or more of the instructions 610, 612, and 614.

The network interface 606 may facilitate communication between the network device 600 and another network device in a network associated with the network device 600. The network interface 606 may include a set of hardware interfaces, such as physical network ports, that permits exchange of data, over a communications network, with another network device.

The trigger detection instructions 610 may cause the processor 604 to detect whether a network frame processing time of the network device exceeds (or equals) a trigger threshold. The trigger informing instructions 612 may cause the processor 604 to inform a second network device (e.g., the coordinating network device) when the network frame processing time of the network device exceeds the trigger threshold. The time data providing instructions 614 may cause the processor 604 to provide time data to the second network device, the time data including a network frame hold time parameter of the network device and a network frame processing time of the network device. Depending on the example, the time data providing instructions 614 may cause the processor 604 to provide time data in response to the second network device requesting such time information. For some examples, the time data may be provided as part of the informing the second network device when the network frame processing time of the network device exceeds the trigger threshold at the network device 600.

FIG. 7 is block diagram illustrating an example network device 700 according to the present disclosure. As described herein, the network device 700 may be any network device having a processor, such as a networked computer system (e.g., desktop, laptop, server, etc.), network switch, network router, or network gateway. For some examples, the network device 700 operates as a trigger network device in a network. As shown, the network device 700 includes a machine-readable medium 702, a processor 704, and a network interface 706. In various examples, the components or the arrangement of components of the network device 700 may differ from what is depicted in FIG. 7. For instance, the network device 700 can include more or less components than those depicted in FIG. 7.

As described herein, the machine-readable medium 702 may be any electronic, magnetic, optical, or other physical storage device that stores executable instructions. The machine-readable medium 702 can be encoded to store executable instructions that cause the processor 704 to perform operations in accordance with various examples described herein. Additionally, the machine-readable medium 702 can be non-transitory. As shown in FIG. 7, the machine-readable medium 702 includes trigger detection instructions 710, trigger informing instructions 712, time data providing instructions 714, adjustment request receiving instructions 716, network frame hold time parameter adjustment instructions 718, and adjustment acknowledgment instructions 720.

As described herein, the processor 704 may be one or more central processing units (CPUs), microprocessors, or other hardware devices suitable for retrieval and execution of one or more instructions stored in the machine-readable medium 702. The processor 704 may fetch, decode, and execute the instructions 710, 712, 714, 716, 718, and 720 to enable the network device 700 to perform operations in accordance with various examples described herein. For some examples, the processor 704 includes one or more electronic circuits comprising a number of electronic components for performing the functionality of one or more of the instructions 710, 712, 714, 716, 718, and 720.

As also described herein, the network interface 706 may facilitate communication between the network device 700 and another network device in a network associated with the network device 700. The network interface 706 may include a set of hardware interfaces, such as physical network ports, that permits exchange of data, over a communications network, with another network device.

For some examples, the trigger detection instructions 710, the trigger informing instructions 712, and the time data providing instructions 714 may are respectively similar to the trigger detection instructions 610, the trigger informing instructions 612, and the time data providing instructions 614 of the network device 600 described above with respect to FIG. 6.

The adjustment request receiving instructions 716 may cause the processor 704 to receive a request from a third network device (e.g., time-available network device) to adjust the network frame hold time parameter based on an allocation of time credit. The network frame hold time parameter adjustment instructions 718 may cause the processor 704 to adjust the network frame hold time parameter based on the allocation of time credit. The adjustment acknowledgment instructions 720 may cause the processor 704 to send an acknowledgment to the third network device at least indicating that the network device has adjusted the network frame processing time based on the allocation of time credit.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A network system, comprising:
   a processor; and
   a non-transitory machine-readable medium comprising instructions to:
   initiate, based on a trigger condition, coordination of adjustments to network frame hold time parameters between network devices in a network;
   obtain time data from a plurality of network devices in the network, the time data describing a network frame hold time parameter of each network device in the plurality and a network frame processing time of each network device in the plurality;
   determine, based on the time data, a set of affected network devices in the plurality being affected by network back pressure in the network and a set of non-affected network devices in the plurality not included in the set of affected network devices;
   determine, based on the time data, a pairing between a time-available network device in the set of non-affected network devices and a time-needed network device in the set of affected network devices, the time-needed network device being a candidate for receiving an allocation of time credit from the time-available network device to adjust its associated network frame hold time parameter based on the allocation; and coordinate transfer of the allocation of time credit between the time-available network device and the time-needed network device, wherein the instructions to coordinate comprise instructions to:
monitor for an acknowledgment from the time-available network device at least indicating that the time-needed network device has adjusted its associated network frame hold time parameter; and
when the acknowledgement is not received from the time-available network device within a timeout period, cause repetition of the obtaining time data, the determining the sets of affected and non-affected network devices, and the determining the pairing.

2. The network system of claim 1, wherein coordinating the transfer of the allocation of time credit comprises providing the time-available network device with pairing data describing the pairing between the time-available network device and the time-needed network device, describing the network frame hold time parameter of the time-needed network device, and describing network frame processing time of the time-needed network device.

3. The network system of claim 1, wherein the trigger condition comprises receiving, from a trigger network device in the network, a signal indicating that a network frame processing time of the trigger network device exceeds a trigger threshold.

4. The network system of claim 1, wherein the network is a Fibre Channel network, and the network system is a principal network device in the Fibre Channel network.

5. The network system of claim 1, wherein, for each network device of the plurality, the network frame processing time comprises an average network frame forward delay of the network device.

6. The network system of claim 1, wherein, for each network device of the plurality, the network frame hold time parameter is a parameter that determines how long a network frame waiting to be forwarded will be held at the network device before it is dropped.

7. The network system of claim 1, wherein the transfer of the allocation of time credit between the time-available network device and the time-needed network device is such that the network frame hold time parameter of the time-available network device is reduced based on the allocation of time credit and the network frame hold time parameter of the time-needed network device increased by the allocation of time credit.

8. A method, comprising:
receiving, at a first network device in a network, pairing data from a second network device in the network, the pairing data describing a pairing between the first network device and a third network device in the network, describing a network frame hold time parameter of the third network device, and describing network frame processing time of the third network device;
determining, by the first network device, an allocation of time credit for the third network device based on the pairing data and on a network frame hold time parameter of the first network device;
adjusting, by the first network device, the network frame hold time parameter of the first network device by reducing the network frame hold time parameter of the first network device by the allocation of time credit;
requesting, by the first network device, the third network device to adjust the network frame hold time parameter of the third network device based on the allocation of time credit;
monitoring, at the first network device, for an acknowledgment from the third network device at least indicating that the third network device has adjusted the network frame hold time parameter of the third network device based on the allocation of time credit; and
after receiving the acknowledgment at the first network device, sending a second acknowledgment from the first network device to the second network device, the second acknowledgment at least indicating that the third network device has adjusted the network frame hold time parameter of the third network device based on the allocation of time credit.

9. The method of claim 8, wherein the network is a Fibre Channel network, and the second network device is a principal network device in the Fibre Channel network.

10. The method of claim 8, wherein the second network device and the third network device are the same network device.

11. The method of claim 8, comprising sending time data from the first network device to the second network device, the time data including a network frame hold time parameter of the first network device and a network frame processing time of the second network device.

12. The method of claim 8, comprising:
when the acknowledgement is not received from the third network device within a timeout period, causing the second network device to restart an adjustment process by not sending an acknowledgement from the first network device to the second network device.

13. The method of claim 8, wherein the requesting comprises:
requesting, by the first network device, the third network device to increase the network frame hold time parameter of the third network device based on the allocation of time credit.

14. The method of claim 8, wherein the network frame processing time of the third network device comprises an average network frame forward delay of the third network device.

15. The method of claim 8, wherein:
the network frame hold time parameter of the first network device is a parameter that determines how long a network frame waiting to be forwarded will be held at the first network device before it is dropped; and
the network frame hold time parameter of the third network device is a parameter that determines how long a network frame waiting to be forwarded will be held at the third network device before it is dropped.

16. A non-transitory machine-readable medium comprising instructions executable by a processor of a first network device to:
receive, at a first network device in a network, pairing data from a second network device in the network, the pairing data describing a pairing between the first network device and a third network device in the network, describing a network frame hold time parameter of the third network device, and describing network frame processing time of the third network device;
determine, by the first network device, an allocation of time credit for the third network device based on the pairing data and on a network frame hold time parameter of the first network device;

adjust, by the first network device, the network frame hold time parameter of the first network device by reducing the network frame hold time parameter of the first network device by the allocation of time credit;

request, by the first network device, the third network device to adjust the network frame hold time parameter of the third network device based on the allocation of time credit;

monitor, at the first network device, for an acknowledgment from the third network device at least indicating that the third network device has adjusted the network frame hold time parameter of the third network device based on the allocation of time credit; and when the acknowledgement is not received from the third network device within a timeout period, cause the second network device to restart an adjustment process by not sending an acknowledgement from the first network device to the second network device.

17. The non-transitory machine-readable medium of claim 16, instructions executable by the processor to:

after receiving the acknowledgment from the third network device, send a second acknowledgment from the first network device to the second network device, the second acknowledgment at least indicating that the third network device has adjusted the network frame hold time parameter of the third network device based on the allocation of time credit.

18. The non-transitory machine-readable medium of claim 16, wherein the instructions to request comprise instructions executable by the processor to:

request, by the first network device, the third network device to increase the network frame hold time parameter of the third network device based on the allocation of time credit.

19. The non-transitory machine-readable medium of claim 16, wherein the network frame processing time of the third network device comprises an average network frame forward delay of the third network device.

20. The non-transitory machine-readable medium of claim 16, wherein:

the network frame hold time parameter of the first network device is a parameter that determines how long a network frame waiting to be forwarded will be held at the first network device before it is dropped; and the network frame hold time parameter of the third network device is a parameter that determines how long a network frame waiting to be forwarded will be held at the third network device before it is dropped.

* * * * *